United States Patent Office 2,872,487
Patented Feb. 3, 1959

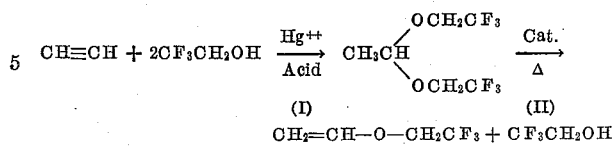

2,872,487

PREPARATION OF 2,2,2-TRIFLUOROETHYL VINYL ETHER

Louise Speers Croix, Summit, N. J., assignor to Air Reduction Company, Incorporated, New York, N. Y., a corporation of New York No Drawing. Application August 15, 1955
Serial No. 528,556

6 Claims. (Cl. 260—614)

This invention relates to an improved method for the preparation of 2,2,2-trifluoroethyl vinyl ether.

This ether has been found to be outstanding as a safe and effective, general anesthetic agent. One method for its preparation, and various modes of its administration to patients for producing anesthesia, are described in detail in the co-pending application, Serial No. 357,901, now Patent No. 2,830,007, of J. G. Shukys which is assigned to the assignee of the present application.

In order to be used for anesthetic purposes, 2,2,2-trifluoroethyl vinyl ether must be substantially completely free of all impurities, since even minute traces of toxic ingredients may produce undesirable side effects during anesthesia, or during the post-anesthesia recovery period. Up to the present time the ether has been prepared by the vinylation of 2,2,2-trifluoroethanol with acetylene, under pressure, as described in the above Shukys' application. Following this vinylation the ether product is preferably further subjected to a purification treatment to insure the complete removal of undesirable and possibly toxic impurities.

It is an object of the present invention to provide an improved method for the preparation of 2,2,2-triffuoroethyl vinyl ether which is simple to perform and which is capable of giving good conversion and high yields, particularly at commercial levels of production.

Another object of the invention is to provide an improved method for the preparathion of 2,2,2-triffuoroethyl vinyl ether which may be carried out at atmospheric pressure, thereby rendering unnecessary the special equipment and precautionary measures required in the high pressure, vinylation method heretofore used.

A further object of the invention is to provide a method in which 2,2,2-trifluoroethyl vinyl ether is obtained readily in a substantially pure form, acceptable for pharmaceutical use.

A still further object of the invention is to provide a novel compound having particular utility as a precursor for the preparation of 2,2,2-trifluoroethyl vinyl ether.

These and other objects are obtained in accordance with this invention by the preparation of di-(2,2,2-trifluoroethyl) acetaldehyde acetal, as a precursor, and converting such compound to the desired 2,2,2-trifluoroethyl vinyl ether. The precursor is represented by the formula:

$$CH_3CH\begin{matrix}OCH_2CF_3\\OCH_2CF_3\end{matrix}$$

In a preferred mode of the invention the preparation is accomplished by reacting acetylene with 2,2,2-trifluoroethanol in the presence of a mercury catalyst and a relatively strong acid substance, and subsequently converting the di-(2,2,2-trifluoroethyl) acetaldehyde acetal, resulting therefrom, by a cracking process, to 2,2,2-trifluoroethyl vinyl ether, by heating in the presence of a suitable catalyst. The preferred preparation is represented by the following equation, in which the two successive reactions are designated by the numerals I and II:

$$CH\equiv CH + 2CF_3CH_2OH \xrightarrow[\text{Acid}]{Hg^{++}} CH_3CH\begin{matrix}OCH_2CF_3\\OCH_2CF_3\end{matrix} \xrightarrow[\Delta]{Cat.}$$

(I)  (II)

$$CH_2=CH-O-CH_2CF_3 + CF_3CH_2OH$$

The intermediate, di-(2,2,2-trifluoroethyl) acetaldehyde acetal, is a novel compound and is also embraced within the scope of the present invention.

The mercury catalyst used for the reaction of acetylene with 2,2,2-trifluoroethanol in the first step of the preparation may be a mercury salt, for example, mercuric oxide. The strongly acid substance used in conjunction therewith may be, for example, a strong mineral acid, such as sulphuric acid, or one or more of the numerous complexes formed from boron trifluoride and oxygenated organic compounds such as ethers, carboxylic acids, etc. An example of such an acid substance which is presently preferred, is the boron trifluoride etherate complex formed from boron trifluoride and ethyl ether. In carrying out the first step of the preparation method, in accordance with a preferred embodiment of the present invention, the acetylene is first rendered substantially pure and completely free of moisture, and thence passed through a mixture of mercuric oxide and boron trifluoride ethyl ether complex suspended in 2,2,2-trifluoroethanol. Such reaction is exothermic and is preferably accompanied by suitable cooling of the reaction mixture so as to maintain the reaction temperature below a preferred maximum upper limit of 80° C. at which undesirable side reactions can occur. More specifically, a temperature range of 40° C. to 60° C. has been found to be best suited for this reaction. When the reaction has been effected, the mixture is neutralized by the addition of an alkaline agent, for example, sodium 2,2,2-trifluoroethanolate. The acetal, then, is separated from the reaction mixture, such as by distillation, preparatory to the conversion thereof to 2,2,2-trifluoroethyl vinyl ether.

The catalysts suited for the conversion of the precursor, di-(2,2,2-trifluoroethyl) acetaldehyde acetal, to 2,2,2-trifluoroethyl vinyl ether comprise, generally, the catalysts which have been found to be effective for organic dehydrations and which are stable under heating. These agents, although effective herein for dealcoholysis, are classified as "dehydration" catalysts and include, for example, metal oxides, such as the oxides of zinc, aluminum, thorium, titanium, zirconium, lead, cerium, tungsten, manganese, iron and nickel; silicon dioxide; silicates and hydrosilicates, such as those of aluminum, magnesium, etc.; aluminates, such as sodium aluminate; phosphoric acid; phosphates and metaphosphates, such as those of magnesium, calcium and sodium; and, carbonaceous substances, for example, graphite and coke. The preferred catalyst materials comprise substances, either natural or synthetic, containing significant amounts of silicates, or silicon dioxide with other metal oxides, for example, pumice, asbestos, diatomaceous earths, and clays, such as kaoline and bentonite. It has been found, for example, that pumice is particularly effective for the conversion of the acetal in the manner herein described. The above materials may be used in conjunction with a noble metal, such as silver or platinum, provided as a coating thereon. Generally, the conversion of the acetal proceeds endothermically, and is preferably carried out at temperatures between 200° C. and 400° C., and at, approximately, atmospheric pressures.

The effects of the various catalysts on the rate of the conversion may vary; the catalysts that are acidic, for example, are, generally, more active in promoting the cleavage of the acetal to split off 2,2,2-trifluoroethanol to form 2,2,2-trifluoroethyl vinyl ether. Temperatures in the upper range of the permissible reaction temperatures, and longer duration for the reaction, may be used to increase the conversion in the presence of the less active catalysts.

Some of the 2,2,2-trifluoroethyl vinyl ether may be lost by decomposition or re-arrangement, following conversion of the acetal, before the reaction product is separated from the catalyst. Such losses occur to a greater extent, apparently, with the more acidic catalysts. The undesired side reactions may be minimized, however, by using lower reaction temperatures, or, by controlling the length of time that the reaction vapors are in contact with the catalyst. Thus, when the reaction is carried out by passing the acetal vapors upwardly through a bed of the catalyst, the reduction in yield resulting from decomposition of 2,2,2-trifluoroethyl vinyl ether can be diminished by increasing the space velocity of the acetal. (The space velocity as used herein is defined as the liters of vaporized acetal delivered per hour, per liter of catalyst; the volume of the catalyst being determined at no-flow conditions.) In order to maintain effective conversions at such increased space velocities, it may be desirable to increase, correspondingly, the surface contact area of the catalyst. This may be accomplished by providing the catalyst in the form of finely comminuted material of a suitable particle size. The acetal, in some instances may, more advantageously, be passed upwardly through the catalyst bed while the bed is maintained in a fluidized state. For example, when using pumice as the catalyst at space velocities in the order of 10–100, pumice having a particle dimension of about 4 to 14 U. S. mesh is suitable. Using pumice as the catalyst with space velocities in the order of 300–1000, under fluidized bed conditions, particle sizes in the range of 200 mesh are used. However, the preferred results using a pumice catalyst are obtained with the former, fixed bed conditions, at relatively lower space velocities.

Although the acetal preferably is obtained directly from the reaction of acetylene and 2,2,2-trifluoroethanol, as described above, it may be obtained for subsequent conversion to 2,2,2-trifluoroethyl vinyl ether by other methods. Thus, for example, vinyl acetate instead of acetylene may be reacted with 2,2,2-trifluoroethanol to give the acetal precursor. This reaction also is promoted by a mercury catalyst in conjunction with a strongly acid substance in substantially the same manner as described in connection with the first step of the above-described preferred process.

The following examples will serve to illustrate the present invention:

I. PREPARATION OF DI-(2,2,2-TRIFLUOROETHYL) ACETALDEHYDE ACETAL

Example 1

The catalyst was prepared by mixing 150 grams of mercuric oxide, 120 ml. of 47 percent boron trifluoride ethyl ether complex and 100 grams of 2,2,2-trifluoroethanol in a 12.5 liter, 3-neck flask. The mixture was stirred and heated to 60° C. A thermometer, a water cooled condenser leading to a bubble counter and Dry Ice trap, a stirrer, and an inlet tube extending below the level of the reaction mixture, were attached to the flask with suitable stoppers. The flask was immersed in a water bath.

5900 grams of 2,2,2-trifluoroethanol were then added and the temperature brought up to 45° C. Acetylene, obtained from a steel cylinder and passed through a Dry Ice trap to insure complete removal of acetone, a $CaSO_4$ drying tube, bubble counter and flowmeter, was then delivered to the inlet tube and bubbled into the flask. The flow rate of the acetylene was adjusted such that all of the acetylene delivered to the flask was absorbed and none passed through the mixture. An immediate change in the color of the catalyst was observed, from bright orange to a dirty brown, as the exothermic reaction commenced. After 15 minutes the flow of acetylene was stabilized at 100 liters per hour and it became necessary to cool the flask with cold water and eventually with ice to prevent the temperature from rising above 50° C. Introduction of acetylene in this manner was continued for 7½ hours, after which the absorption of the acetylene became noticeably slower and the reaction mixture appeared almost black and was slightly thickened. The mixture was then cooled and neutralized with a solution of 60 grams of sodium in 600 ml. of ethyl ether and 600 grams of 2,2,2-trifluoroethanol. By quick vacuum distillation at 60°–70° C. and 30 mm. pressure, 6700 grams of clear distillate were collected in a Dry Ice cooled receiver; the distillate was then fractionally distilled in a 50-plate column to give 250 grams of ethyl ether, B. P. 35°–40° C., 1531 grams of trifluoroethanol, B. P. 70°–76° C., and 4846 grams of crude di-(2,2,2-trifluoroethyl) acetaldehyde acetal, B. P. 110°–114° C. The crude product, thus obtained, when subjected to further fractional distillation, yielded the substantially pure di-(2,2,2-trifluoroethyl) acetaldehyde acetal, B. P. 114° C.; $n_D^{20}=1.3159$; $d_D^{20}=1.3278$. This fraction gave the following analysis:

Calc. for $C_6H_9F_6O_2$: C=31.87; H=3.57; F=50.42. Found: C=32.01; H=3.34; F=49.67.

Example 2

PREPARATION OF DI-(2,2,2-TRIFLUOROETHYL) ACETALDEHYDE ACETAL FROM VINYL ACETATE

To 200 grams of 2,2,2-trifluoroethanol, in a three-neck, 1 liter flask, equipped with thermometer, dropping funnel, stirrer and condenser, were added 1 gram of mercuric oxide (red) and 1 cc. of boron trifluoride-ether complex. 86 grams of vinyl acetate (stabilized commercial grade) were then added through the dropping funnel at a rate of 1 drop per second over a period of one hour. The temperature rose gradually from 35° to 50° C., after 35 minutes, following which the flask was maintained at 40°–50° C. by means of water cooling. When the vinyl acetate was all added, stirring was continued for another hour. The mixture was then neutralized and washed twice with 56 grams of sodium carbonate in 250 cc. of water. The top water layer was separated and the organic layer dried over $K_2CO_3$. 168 grams of black liquid were obtained by filtration, which, upon fractional distillation, gave 140 grams of di-(2,2,2-trifluoroethyl) acetaldehyde acetal, B. P. 110°–117° C., suitable for conversion to 2,2,2-trifluoroethyl vinyl ether.

II. CONVERSION OF DI-(2,2,2-TRIFLUOROETHYL) ACETALDEHYDE ACETAL TO 2,2,2-TRIFLUOROETHYL VINYL ETHER

Example 3

A cracking tube 26″ long and having a 1″ diameter was used to provide a catalyst bed. A thermocouple well extended along the length of the cracking tube to enable temperature measurements within the bed. The capacity of the tube was approximately 195 cc. A preheating tube 4½″ long, and ½″ in diameter was connected to the inlet end of the cracking tube. Acetal was delivered to the preheating tube by means of a dropping funnel attached thereto. The opposite end of the cracking tube was connected to a 100 ml. receiving flask having a water cooled condenser outlet. Electric heating coils having adjustable resistances were arranged around the preheating tube and the cracking tube, for maintaining the desired heating of the acetal and the catalyst bed.

The cracking tube was filled with pea size pumice and the tube was then heated while air was passed therethrough over a period of 4 hours to completely dry the catalyst. With the cracking tube heated throughout its length within the desired reaction temperature range and the temperature recorded in the central 10″ length of the tube at 340°–390° C., 68 grams of di-(2,2,2-trifluoroethyl) acetaldehyde acetal obtained, as above-described in Example 1, were delivered to the preheating tube at 1 gram per minute over a period of 1.3 hours. The acetal was vaporized and passed through the heated catalyst bed at a calculated space velocity of 25.9 liters/hour/liter. The exit vapors were condensed and 65 grams collected which were fractionated to give 22 grams (58% conversion and 87.7% yield) of 2,2,2-trifluoroethyl vinyl ether, B. P. 42°–50° C.

The catalyst was readily regenerated by passing air through the cracking tube for 19 hours, while heating to reaction temperature.

1000 grams of the crude 2,2,2-trifluoroethyl vinyl ether, prepared by the conversion of di-(2,2,2-trifluoroethyl) acetaldehyde acetal in a series of runs, as described above, were further treated to obtain the substantially pure ether, suitable for anesthetic use. The 1000 grams of the ether thus obtained were first washed twice with 5 N sodium hydroxide solution. The ether layer was separated and dried quickly with potassium hydroxide pellets and the dry ether then stirred at reflux temperature with additional potassium hydroxide to remove any acetaldehyde by condensation. Final distillation yielded 769 grams of substantially pure 2,2,2-trifluoroethyl vinyl ether, B. P. 42.5° C./751 mm.; $n_D^{20}$=1.3192. The pure product when intended for pharmaceutical use is preferably collected in brown bottles and immediately inhibited with 0.01% phenyl alpha-naphthalamine.

*Example 4*

A catalyst comprising pumice coated with approximately 10% by weight of silver was prepared by soaking 230 grams of pea size pumice in a solution of 37 grams $AgNO_3$ in 100 ml. water and evaporating to dryness in a steam bath. The coated catalyst was slightly grey in color.

The cracking tube described in Example 3 was filled with the catalyst, prepared as described, after which the tube was heated to about 100–150° C., with air passing through for one hour, until no further water or $NO_2$ fumes were evolved. The silver oxide thus formed was reduced by passing hydrogen through the tube while heating to 250°–260° C. With the tube heated throughout its length within the desired reaction temperature range and the temperature recorded in the central 10 inch length at 303°–346° C., 68 grams of the di-(2,2,2-trifluoroethyl) acetaldehyde acetal were delivered dropwise over a period of 2 hours to the preheating tube; vaporized; and passed through the cracking tube. The calculated space velocity was 16.8 liters/hour/liter. The condensed exit vapors amounted to 64 grams which were fractionated to give 16 grams of 2,2,2-trifluoroethyl vinyl ether suitable for further purification for anesthetic use; conversion 42.2%; yield 79.8%.

*Example 5*

A catalyst consisting of 2 percent $Fe_2O_3$ on pumice was prepared by soaking 300 grams of pea size pumice in a solution of 11.4 grams of $FeCl_3$ in 400 ml. distilled water. Approximately 12 grams of KOH (as 30 percent aqueous solution) were added to make alkaline to pH paper, producing a heavy, red $Fe(OH)_3$ precipitate. Upon evaporation to dryness over a steam bath, the hydroxide was dehydrated to give the desired ferric oxide on pumice catalyst.

The cracking tube, described in Example 3, was filled with the $Fe_2O_3$ catalyst prepared in the manner above-described, and air passed through the tube for 23 hours while at reaction temperature, to dry the catalyst. With the cracking tube heated throughout its length within the desired reaction temperature range and the temperature recorded in the central 10 inch length of the tube at 319°–374° C., 68 grams of di-(2,2,2-trifluoroethyl) acetaldehyde acetal were delivered dropwise over a period of 0.9 hour to the preheating tube; vaporized; and, passed through the cracking tube. The calculated space velocity was 37.4 liters/hour/liter. The condensed exit vapors amounted to 66 grams which were fractionated to give 6 grams of 2,2,2-trifluoroethyl vinyl ether suitable for further purification for use as an anesthetic. The yield was 64.1% and the conversion was 15.8%.

*Example 6*

A platinized asbestos catalyst was used containing 10% by weight of platinum. The apparatus used was substantially identical to that described in Example 3.

The cracking tube was filled with the platinized asbestos catalyst and the tube flushed with nitrogen for a period of two hours while heating, to dry the catalyst. With the cracking tube heated throughout its length within the reaction temperature range and the maximum temperature, at the inlet end of the tube, recorded at 390° C., 30 grams of di-(2,2,2-trifluoroethyl) acetaldehyde acetal were delivered dropwise over a period of 2 hours to the preheating tube; vaporized; and, passed through the cracking tube. The calculated space velocity was 7.4 liters/hour/liter. The condensed exit vapors amounted to 26 grams which were fractionated to give 8 grams of 2,2,2-trifluoroethyl vinyl ether suitable for further purification for use as an anesthetic. The yield was 65.8% and the conversion was 48.2%.

It will be seen that many changes may be made in the details above-described without departing from the scope, or sacrificing any of the advantages, of the present invention, defined in the following claims.

I claim:

1. The method which comprises reacting acetylene with 2,2,2-trifluoroethanol in the presence of a mercury catalyst and a strongly acid substance, neutralizing the reaction mixture, separating di-(2,2,2-trifluoroethyl) acetaldehyde acetal therefrom, heating the di-(2,2,2-trifluoroethyl) acetaldehyde acetal at a temperature between 200° C. and 400° C. in the presence of a dehydration catalyst and obtaining therefrom 2,2,2-trifluoroethyl vinyl ether.

2. The method which comprises reacting acetylene with 2,2,2-trifluoroethanol in the presence of a mercury catalyst and a strongly acid substance, neutralizing the reaction mixture, and separating di-(2,2,2-trifluoroethyl) acetaldehyde acetal therefrom.

3. The method according to claim 2, wherein said strongly acid substance is selected from the group consisting of strong mineral acids and boron trifluoride complexes of oxygenated organic compounds.

4. The method which comprises reacting vinyl acetate with 2,2,2-trifluoroethanol in the presence of a mercury catalyst and a strongly acid substance, neutralizing the mixture, and separating di-(2,2,2-trifluoroethyl) acetaldehyde acetal therefrom.

5. The method which comprises heating di-(2,2,2-trifluoroethyl) acetaldehyde acetal at a temperature between 200° C. and 400° C. in the presence of a dehydration catalyst and obtaining therefrom, 2,2,2-trifluoroethyl vinyl ether.

6. The compound, di-(2,2,2-trifluoroethyl) acetaldehyde acetal, having the formula,

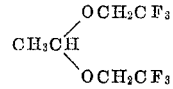

References Cited in the file of this patent

UNITED STATES PATENTS

| | | |
|---|---|---|
| 1,796,690 | Herrmann et al. | Mar. 17, 1931 |
| 1,902,169 | Herrmann et al. | Mar. 21, 1933 |
| 2,140,713 | Nieuwland et al. | Dec. 20, 1938 |
| 2,374,078 | Coffman | Apr. 17, 1945 |
| 2,433,844 | Hanford | Jan. 6, 1948 |
| 2,732,370 | Codding | Jan. 24, 1956 |

UNITED STATES PATENT OFFICE

Certificate of Correction

February 3, 1959

Patent No. 2,872,487

Louise Speers Croix

It is hereby certified that error appears in the printed specification of the above numbered patent requiring correction and that the said Letters Patent should read as corrected below.

Column 4, line 23, for the expression "$d_D^{20}=1.3278$." read —$d_4^{20}=1.3278$.—.

Signed and sealed this 18th day of August 1959.

[SEAL]

Attest:
KARL H. AXLINE,
Attesting Officer.

ROBERT C. WATSON
Commissioner of Patents